(12) United States Patent
Fang et al.

(10) Patent No.: US 12,418,446 B2
(45) Date of Patent: Sep. 16, 2025

(54) SIGNAL TRANSMISSION METHOD AND SYSTEM BASED ON CONSTELLATION-AIDED LoRa

(71) Applicant: Guangdong University of Technology, Guangzhou (CN)

(72) Inventors: Yi Fang, Guangzhou (CN); Yu Zhou, Guangzhou (CN); Huan Ma, Guangzhou (CN); Bo Nie, Guangzhou (CN)

(73) Assignee: Guangdong University of Technology, Guangzhou (CN)

( * ) Notice: Subject to any disclaimer, the term of this patent is extended or adjusted under 35 U.S.C. 154(b) by 0 days.

(21) Appl. No.: 19/021,037

(22) Filed: Jan. 14, 2025

(65) Prior Publication Data
US 2025/0254072 A1 Aug. 7, 2025

(30) Foreign Application Priority Data
Jul. 25, 2024 (CN) .......................... 202411001312.4

(51) Int. Cl.
*H04L 27/20* (2006.01)
*H04B 1/7097* (2011.01)
*H04B 1/69* (2011.01)

(52) U.S. Cl.
CPC ....... *H04L 27/2035* (2013.01); *H04B 1/7097* (2013.01); *H04B 2001/6912* (2013.01)

(58) Field of Classification Search
CPC .............. H04L 27/2035; H04B 1/7097; H04B 2001/6912
See application file for complete search history.

(56) References Cited

U.S. PATENT DOCUMENTS

| | | |
|---|---|---|
| 2014/0086280 A1 | 3/2014 | Huang |
| 2015/0117866 A1 | 4/2015 | Chien et al. |
| 2023/0155626 A1 | 5/2023 | Fang et al. |

FOREIGN PATENT DOCUMENTS

| | | |
|---|---|---|
| CN | 111756666 A | 10/2020 |
| CN | 112738001 A | 4/2021 |

(Continued)

OTHER PUBLICATIONS

Machine translation of CN-113595953-A (Year: 2021).*

(Continued)

*Primary Examiner* — Jean B Corrielus

(57) ABSTRACT

A signal transmission method based on constellation-aided LoRa modulation includes: a modulated bit sequence and a phase shift keying (PSK) bit sequence are obtained, and the modulated bit sequence is subjected to Gray mapping and spread spectrum modulation to generate a LoRa signal set; the PSK bit sequence is subjected to PSK constellation mapping based on a preset constellation point coordinate set to output a PSK constellation point set; the LoRa signal set is subjected to PSK modulation based on a preset imaginary unit and the PSK constellation point set to generate a transmission signal; a complex number sequence is generated based on the transmission signal and a preset raw down chirp signal; and real-imaginary part judgment is performed on the complex number sequence to output a LoRa modulation information sequence set and a PSK symbol judgment result. A signal transmission system based on CA-LoRa is further provided.

6 Claims, 10 Drawing Sheets

(56) References Cited

FOREIGN PATENT DOCUMENTS

| | | |
|---|---|---|
| CN | 116389208 A | 7/2023 |
| CN | 116886481 A | 10/2023 |
| WO | 2015104058 A1 | 7/2015 |

OTHER PUBLICATIONS

Ivo Bizon Franco de Almeida et al., "In-phase and Quadrature Chirp Spread Spectrum for IoT Communications", 2020 IEEE Global Communications Conference, Feb. 15, 2021, pp. 1-6.

Rui Xu et al., "Carrier Synchronization of Quadrature Square Wave LoRa: Analysis and Solutions", Telecommunication Engineering, vol. 64, No. 11, Feb. 27, 2024, pp. 1872-1877.

* cited by examiner

SIGNAL TRANSMISSION METHOD AND SYSTEM BASED ON CONSTELLATION-AIDED LoRa

CROSS-REFERENCE TO RELATED APPLICATIONS

This application claims the benefit of priority from Chinese Patent Application No. 202411001312.4, filed on Jul. 25, 2024. The content of the aforementioned application, including any intervening amendments thereto, is incorporated herein by reference in its entirety.

TECHNICAL FIELD

This application relates to wireless communication, and more particularly to a signal transmission method and system based on constellation-aided Long Range (CA-LoRa).

BACKGROUND

With the rapid development of Internet of Things (IoT) technology, a long-range and low-power wireless communication technology is urgently required in some application scenarios such as smart agriculture, intelligent surveillance and smart buildings. Low-power wide-area networks (LPWANs) play an important role in the IoT.

Long Range (LoRa) technology, developed by semtech corporation, is a relatively mature LPWAN technology which has been widely applied to the IoT. The LoRa technology has been considered as the most promising technology due to its low power consumption, long range, excellent scalability, and low cost, as well as excellent physical layer modulation scheme and adaptive data rate. Extensive researches have been conducted on the LoRa technology.

The existing signal transmission technologies based on LoRa mainly use chirp spread spectrum (CSS) modulation and adaptive data rate. The transmission distance of LoRa is regulated by the spreading factor (SF), and the larger the SF, the longer the transmission distance, which will result in a lower signal transmission rate.

SUMMARY

This application provides a constellation-aided LoRa (CA-LoRa)-based signal transmission method and system for solving the technical problem of a low signal transmission rate in the existing LoRa-based signal transmission techniques.

Technical solutions of this application are described as follows.

In a first aspect, this application provides a signal transmission method based on constellation-aided Long Range (CA-LoRa), comprising:
(a) obtaining a modulated bit sequence and a phase shift keying (PSK) bit sequence; performing a Gray mapping and spread spectrum modulation on the modulated bit sequence; and generating, by a LoRa modulator, a LoRa signal set;
(b) performing PSK constellation mapping on the PSK bit sequence by using a preset constellation point coordinate set to output a phase shift keying (PSK) constellation point set;
(c) performing PSK modulation on the LoRa signal set based on a preset imaginary unit and the PSK constellation point set to generate a transmission signal;
(d) generating a complex number sequence based on the transmission signal and a preset discrete-time raw down chirp signal; and
(e) performing a real-imaginary part judgment on the complex number sequence to output a LoRa modulation information sequence set and a PSK symbol judgment result.

In an embodiment, a LoRa signal set comprises a first LoRa signal and a second LoRa signal; the LoRa signal set is generated through steps of:
(a1) performing a serial-parallel conversion operation on the modulated bit sequence to generate a parallel modulated bit sequence;
(a2) dividing the parallel modulated bit sequence into a first parallel modulated bit subsequence and a second parallel modulated bit subsequence;
(a3) subjecting the first parallel modulated bit subsequence to Gray mapping and decimal conversion to generate a first decimal information data, and subjecting the second parallel modulated bit subsequence to Gray mapping and decimal conversion to generate a second decimal information data; and
(a4) performing LoRa modulation on the first decimal information data and the second decimal information data to generate the first LoRa signal and the second LoRa signal, respectively.

In an embodiment, the PSK constellation point set comprises a first PSK constellation point and a second PSK constellation point;
step (c) comprises:
(c1) rotating, by a phase shifter, a phase of the second LoRa signal by $\pi/2$; multiplying the second LoRa signal by the preset imaginary unit to obtain a LoRa imaginary signal; and multiplying the LoRa imaginary signal by the second PSK constellation point to obtain a first PSK LoRa signal; and
(c2) multiplying the first LoRa signal by the first PSK constellation point to obtain a second PSK LoRa signal; subjecting the second PSK LoRa signal and the first PSK LoRa signal to superposition to generate the transmission signal; outputting, by a LoRa terminal, the transmission signal.

In an embodiment, step (d) comprises:
performing channel interference on the transmission signal to generate a signal, and deploying a LoRa gateway to receive the signal as a received signal;
multiplying the received signal by the preset discrete-time raw down chirp signal to obtain a received chirp signal;
de-chirping the received chirp signal to output a de-chirped signal; and
performing discrete Fourier transform on the de-chirped signal to generate the complex number sequence.

In an embodiment, the LoRa modulation information sequence set comprises a first LoRa modulation information sequence and a second LoRa modulation information sequence; and
step (e) comprises:
subjecting the complex number sequence to real part extraction and imaginary part extraction to obtain a real part sequence and an imaginary part sequence, respectively;
selecting a maximum real part number from the real part sequence and a maximum imaginary part number from the imaginary part sequence;
subjecting an index value corresponding to the maximum real part number and an index value corresponding to the maximum imaginary part number to number system conversion to output the first LoRa modulation information sequence and the second LoRa modulation information sequence, respectively;

calculating a plurality of Euclidean distances by using the maximum real part number, the maximum imaginary part number, and a plurality of constellation point coordinates in the preset constellation point coordinate set; and taking a constellation point coordinate corresponding to a smallest Euclidean distance among the plurality of Euclidean distances as the PSK symbol judgment result;

and sending, by a LoRa gateway, the first LoRa modulation information sequence, the second LoRa modulation information sequence, and the PSK symbol judgment result to a server for data processing.

In an embodiment, the LoRa signal set is expressed as:

$$\begin{cases} s_{m_x}(n) = \sqrt{\frac{E_s}{M}} \exp\left(j\frac{2\pi}{M}m_x n\right) c(n) \\ s_{m_y}(n) = \sqrt{\frac{E_s}{M}} \exp\left(j\frac{2\pi}{M}m_y n\right) c(n) \end{cases};$$

wherein $s_{m_x}(n)$ represents the first LoRa signal; $E_s$ represents an energy carried by a transmitted symbol; M is the number of chips of the LoRa symbol, and $M=2^{SF}$; SF is a spreading factor; j is the preset imaginary unit; $m_x$ is the first decimal information data; n is a time domain index, and n=0, 1, 2, ..., M−1; C(n) represents a discrete-time initial raw up-chirp signal, and $$c(n) = \exp\left(\frac{j\pi n^2}{M}\right);$$

$m_y$ is the second decimal information data; and $s_{m_y}(n)$ represents the second LoRa signal.

In a second aspect, this application provides a signal transmission system based on CA-LoRa, comprising:
an acquisition module;
a mapping module;
a first generation module;
a second generation module; and
an output module;
wherein the acquisition module is configured for obtaining a modulated bit sequence and a PSK bit sequence, and performing a Gray mapping and spread spectrum modulation on the modulated bit sequence to generate a LoRa signal set;
the mapping module is configured for performing PSK constellation mapping on the PSK bit sequence by using a preset constellation point coordinate set to output a PSK constellation point set;
the first generation module is configured for performing PSK modulation on the LoRa signal set based on a preset imaginary unit and the PSK constellation point set to generate a transmission signal;
the second generation module is configured for generating a complex number sequence based on the transmission signal and a preset discrete-time raw down chirp signal; and
the output module is configured for performing a real-imaginary part judgment on the complex number sequence to output a LoRa modulation information sequence set and a PSK symbol judgment result.

In a third aspect, this application provides a computer device, comprising:
a processor;
a memory; and
a computer program; and
wherein the computer program is stored in the memory; and the computer program is configured to be executed by the processor to perform the signal transmission method above.

In a fourth aspect, this application provides a computer-readable storage medium, comprising:
a computer program or a computer instruction;
wherein the computer program or the computer instruction is configured to be executed by a processor to perform the signal transmission method above.

In a fifth aspect, this application provides a computer program product, comprising:
a computer program or a computer instruction; and
wherein the computer program or the computer instruction is configured to be executed by a processor to perform the signal transmission method above.

Compared with the prior art, this application has the following technical effects.

This application provides a signal transmission method based on CA-LoRa. First, a modulated bit sequence and a PSK constellation bit sequence are obtained, and Gray mapping and spread spectrum modulation is performed on the modulated bit sequence, and a LoRa signal set is generated. Then, PSK constellation mapping is performed on the PSK bit sequence by using a preset constellation point coordinate set to output a PSK constellation point set. PSK modulation is performed on the LoRa signal set based on a preset imaginary unit and the PSK constellation point set to generate a transmission signal. A complex number sequence is generated based on the transmission signal and a preset discrete-time raw down chirp signal. A real-imaginary part judgment is performed on the complex number sequence to output a LoRa modulation information sequence set and a PSK symbol judgment result. Based on the above scheme, the transmission signal is generated by performing quadrature modulation on the LoRa signal set based on the preset imaginary unit and the PSK constellation point set. The LoRa modulation information sequence set and the PSK symbol judgment result are output based on the transmission signal and the preset discrete-time raw down chirp signal. Thus, while the LoRa modulation information sequence set is transmitted, the PSK symbol judgment result is also transmitted, thereby greatly enhancing the transmission rate of the signal.

BRIEF DESCRIPTION OF THE DRAWINGS

In order to illustrate the technical solutions in the embodiments of the present disclosure or the prior art more clearly, the drawings required in the description of the embodiments or the prior art will be briefly described below. Obviously, presented in the drawings are merely some embodiments of the present disclosure, which are not intended to limit the disclosure. For those skilled in the art, other drawings may also be obtained according to the drawings provided herein without paying creative efforts.

DETAILED DESCRIPTION OF EMBODIMENTS

This disclosure provides a CA-LoRa-based signal transmission method and system for solving the technical problem of a low signal transmission rate in the existing LoRa modulation-based signal transmission techniques.

In order to make the objects, features, and advantages of the present disclosure more clearly, the technical solutions in the embodiments of the present disclosure are described clearly and completely in combination with the drawings. Obviously, presented in the embodiments are merely some embodiments of the present disclosure, which are not intended to limit the disclosure. For those skilled in the art, other embodiments may also be obtained according to the embodiments provided herein without paying creative efforts.

Figure 1:
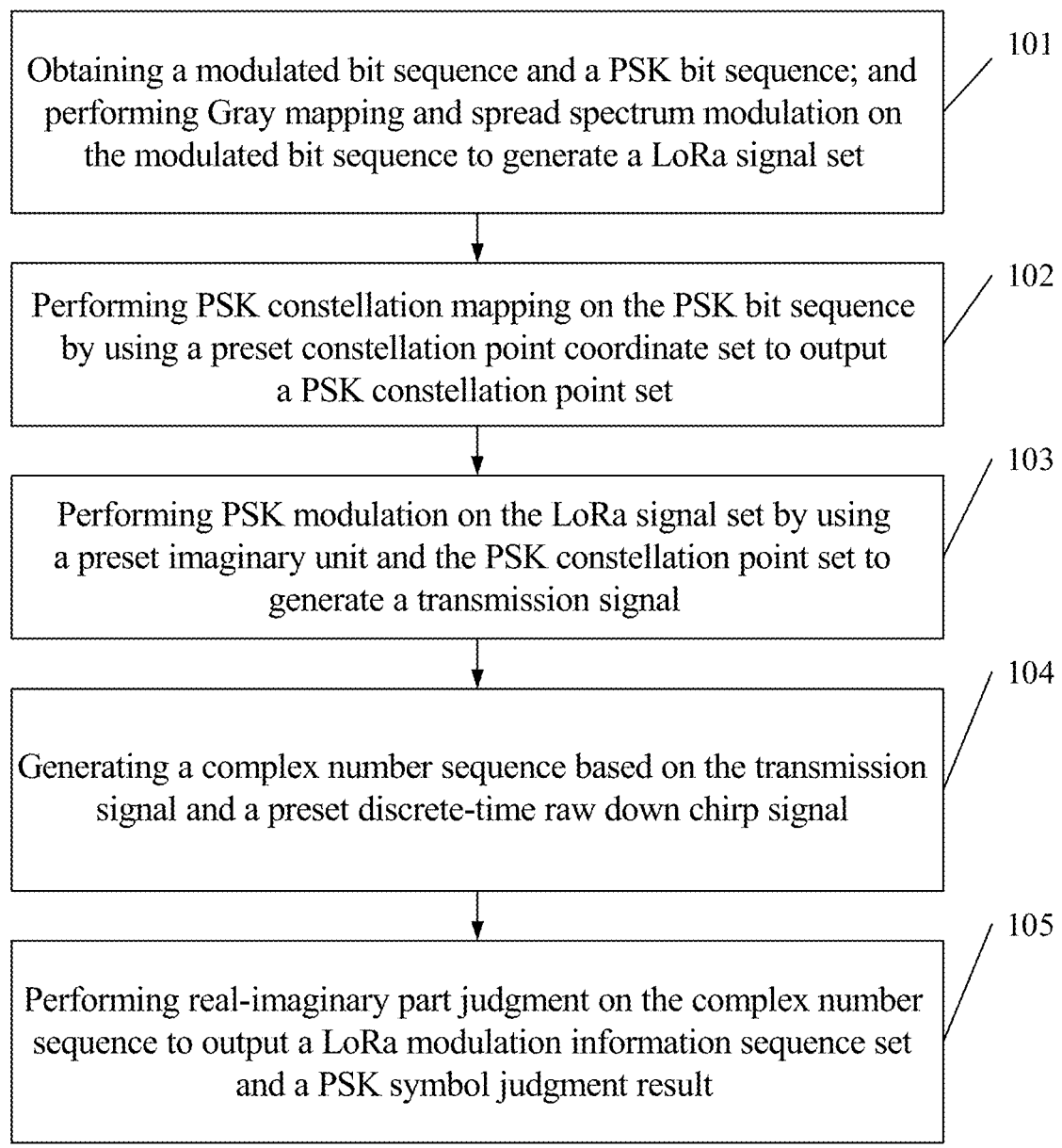
FIG. 1 is a flowchart of a signal transmission method based on CA-LoRa according to an embodiment of the present disclosure.

FIG. 1 shows a flowchart of a signal transmission method based on CA-LoRa.

The signal transmission method based on CA-LoRa includes the following steps (101)-(105).

(101) A modulated bit sequence and a phase shift keying (PSK) bit sequence are obtained, the modulated bit sequence is performed with Gray mapping and spread spectrum modulation, and a LoRa signal set is generated by a LoRa modulator.

The LoRa signal set includes a first LoRa signal and a second LoRa signal.

It is to be noted that the total number of information bits transmitted by the CA-LoRa transceiver system (CA-LoRa system) in the present disclosure in one symbol cycle is P, i.e., the total number of information bits of the modulated bit sequence and the PSK bit sequence. $P=P_1+P_2$, $P_1$ is the total number of modulated bits of the modulated bit sequence numbered 2SF, and $P_2$ is the total number of PSK bits of the PSK bit sequence, namely number of bits carried by the PSK symbols. The CA-LoRa transceiver system includes a transmitter, a wireless channel, and a receiver.

Specifically, the modulated bit sequence of $P_1$ bits undergoes a serial-parallel conversion operation to generate a parallel modulated bit sequence. The parallel modulated bit sequence is divided into a first parallel modulated bit subsequence and a second parallel modulated bit subsequence. Then, the first parallel modulated bit subsequence and the second parallel modulated bit subsequence are performed with Gray mapping and decimal conversion, respectively, to generate the first decimal information data and the second decimal information data. The first decimal information data and the second decimal information data are performed with LoRa modulation to generate the first LoRa signal and the second LoRa signal, respectively.

Specifically, the LoRa signal set is expressed as:

$$\begin{cases} s_{m_x}(n) = \sqrt{\frac{E_s}{M}} \exp\left(j\frac{2\pi}{M}m_x n\right) c(n) \\ s_{m_y}(n) = \sqrt{\frac{E_s}{M}} \exp\left(j\frac{2\pi}{M}m_y n\right) c(n) \end{cases}$$

In above formulas, $s_{m_x}(n)$ represents the first LoRa signal; $E_s$ represents an energy carried by a transmitted symbol; M is the number of chips of the LoRa symbol, and $M=2^{SF}$; SF is a spreading factor; j is the preset imaginary unit; $m_x$ is the first decimal information data; n is a time domain index, and n=0, 1, 2, ..., M−1; C(n) represents a discrete-time initial raw up-chirp signal, and $$C(n) = \exp\left(\frac{j\pi n^2}{M}\right);$$

$m_y$ is the second decimal information data; and $s_{m_y}(n)$ represents the second LoRa signal.

In this embodiment, the modulated bit sequence and the PSK bit sequence are obtained, the Gray mapping and spread spectrum modulation is performed on the modulated bit sequence, and the LoRa signal set is generated.

(102) PSK constellation mapping is performed on the PSK bit sequence by using a preset constellation point coordinate set to output a PSK constellation point set.

Figure 2A:
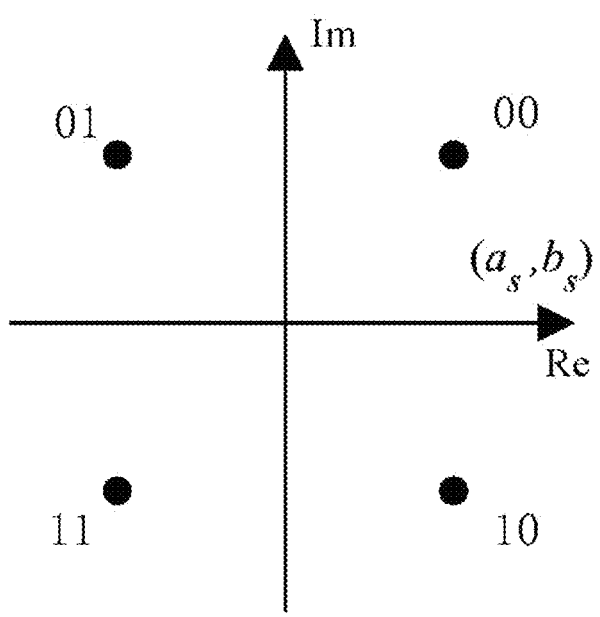
FIG. 2a is a schematic diagram of a 4PSK constellation map according to an embodiment of the present disclosure.
Figure 2B:
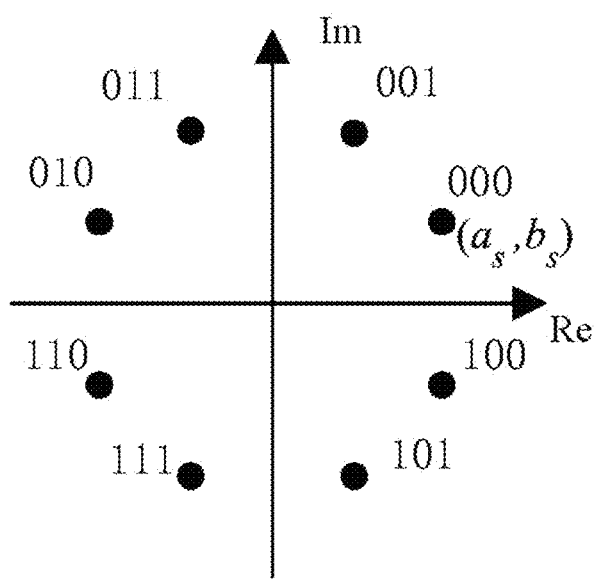
FIG. 2b is a schematic diagram of an 8PSK constellation map according to an embodiment of the present disclosure.

It should be noted that the process of PSK constellation mapping on the PSK bit sequence using the preset constellation point coordinate set is as follows: the PSK bit sequence $[c_1, c_2, \ldots c_{P2}]$ of $P_2$ bits is mapped into the constellation points $(a_s, b_s)$, i.e., PSK constellation point set, through the one-to-one mapping relationship between the PSK bits and the preset constellation point coordinate set. FIGS. 2a and 2b show two examples of 4PSK and 8PSK constellation maps used in the constellation map index-aided LoRa modulation. s represents an index indicating that the transmitted PSK symbol is the s-th symbol in the PSK symbol set.

In this embodiment, the PSK constellation mapping is performed on the PSK bit sequence by using the preset constellation point coordinate set to output the PSK constellation point set.

(103) The LoRa signal set is performed with the PSK modulation by the preset imaginary unit and the PSK constellation point set to generate a transmission signal.

The PSK constellation point set include a first PSK constellation point $a_s$, namely coordinate of the real axis and a second PSK constellation point $b_s$, namely coordinate of the imaginary axis. The first PSK constellation point is a horizontal coordinate of the PSK constellation point set, and the second PSK constellation point is a vertical coordinate of the PSK constellation point set.

It is to be noted that the process of performing the PSK modulation on the LoRa signal set based on the preset imaginary unit and the PSK constellation point set is as follows. The second LoRa signal is multiplied by the preset imaginary unit to determine the second LoRa imaginary signal. The second LoRa imaginary signal is multiplied by the second PSK constellation point to determine the second PSK LoRa signal. The first LoRa signal is multiplied by the first PSK constellation point to determine the first PSK LoRa signal. The first PSK LoRa signal and the second PSK LoRa signal are subjected with superposition to output the transmission signal. In the process, the phase of the second LoRa signal is rotated by π/2. That is, the second LoRa signal is multiplied by the preset imaginary unit j, thereby making the second LoRa signal orthogonal to the first LoRa signal, making the first LoRa signal and the second LoRa signal as a set of orthogonal bases, acting the PSK constellation point set on the orthogonal base, and transmitting additional PSK bits, i.e., the PSK bits. The transmission signals may be linearly represented as:

$$s(n) = a_s S_{m_x}(n) + jb_s S_{m_y}(n).$$

In above formula, s(n) is the transmission signal; $a_s$ is the coordinate of the real axis, denoting the real part of the transmission signal; $S_{m_x}(n)$ represents the first LoRa signal; j is a preset imaginary unit, i.e., the imaginary unit; $b_s$ is the coordinate of the imaginary axis, denoting the imaginary part of the transmission signal, and $a_s^2 + b_s^2 = 1$; $S_{m_y}(n)$ represents the second LoRa signal; s is the index, denoting that the transmitted PSK symbol is the s-th symbol in the PSK symbol set (the PSK constellation point set), and s=1, 2, ..., $2^{N_p}$, where Np is the number of PSK bits.

In this embodiment, the LoRa signal set is performed with PSK modulation based on the preset imaginary unit and the PSK constellation point set to generate the transmission signal.

(104) A complex number sequence is generated based on the transmission signal and the preset discrete-time raw down chirp signal.

Specifically, the channel interference is performed on the transmission signal through the wireless channel to output the received signal. The process of channel interference can be expressed as:

$$r(n) = hs(n) + w(n).$$

Where r(n) is the received signal; s(n) is the transmission signal; w(n) represents the additive white Gaussian noise (AWGN) with zero mean and $N_0/2$ variance; h represents the amplitude of the fading channel coefficient, and if h=1, the wireless channel is an AWGN channel, and if h obeys a Rayleigh distribution, the wireless channel is a Rayleigh channel.

Further, the received signal is multiplied by the preset discrete-time raw down chirp signal to determine the received chirp signal. The received chirp signal is subjected to de-chirp operation to output the de-chirped signal. The de-chirped signal is subjected to a discrete Fourier transform (DFT) to generate the complex number sequence. The complex number sequence can be expressed as follows:

$$\begin{aligned} R(k) &= DFT[r(n)h^* s_0^*(n)] \\ &= \sum_{n=0}^{M-1} r(n)h^* s_0^*(n) \exp\left(-\frac{j\pi n^2}{M}\right) \\ &= h^* \left\{ \sum_{n=0}^{M-1} ha_s S_{m_x}(n) s_0^*(n) \exp\left(-\frac{j\pi n^2}{M}\right) \right. \\ &\quad \left. + \sum_{n=0}^{M-1} hb_s S_{m_y}(n) s_0^*(n) \exp\left(-\frac{j\pi n^2}{M}\right) \right\} + W(k) \\ &= R_r(k) + jR_i(k) \end{aligned}$$

Where R(k) represents the complex number sequence after the DFT; DFT represents the DFT operation; r(n) is the received signal; h* represents the complex conjugate of the amplitude of the fading channel coefficient; $s^*_0(n)$ represents the complex conjugate of the preset discrete-time raw down chirp signal; j is the imaginary unit; n is the time domain index, n=0, 1, 2, ..., M−1; M is the number of chips of the LoRa symbol; $a_s$ is the first PSK constellation point; $R_r(k)$ is the real part sequence, denoting the real part of R(k); $R_i(k)$ is the imaginary part sequence, denoting the imaginary part of R(k); $s_{m_x}(n)$ represents the first LoRa signal; $s_{m_y}(n)$ represents the second LoRa signal; $b_s$ is the second PSK constellation point; and W(k) represents a complex Gaussian noise.

In this embodiment, the complex number sequence is generated based on the transmission signal and the preset discrete-time raw down chirp signal.

(105) The complex number sequence is performed with the real-imaginary part judgment to output the LoRa modulation information sequence set and the PSK symbol judgment result.

The LoRa modulation information sequence set includes a first LoRa modulation information sequence and a second LoRa modulation information sequence.

Specifically, the real part extraction and the imaginary part extraction are performed on the complex number sequence, respectively, to determine a real part sequence and an imaginary part sequence. The real part sequence includes a plurality of real numbers of real parts, and the imaginary part sequence includes a plurality of real numbers of imaginary parts. For example, the real number of the imaginary part of 1+j is 1. The maximum real part number and the maximum imaginary part number are selected from the real part sequence and the imaginary part sequence, respectively. The maximum real part number is the real number of the maximum real part, and the maximum imaginary part number is the real number of the maximum imaginary part. A first index value corresponding to the maximum real part number and a second index value corresponding to the maximum imaginary part number are performed with number system conversion to output the first LoRa modulation information sequence and the second LoRa modulation information sequence, respectively.

Further, a plurality of Euclidean distances are calculated using the maximum real part number, the maximum imaginary part number, and a plurality of constellation point coordinates in the preset constellation point coordinate set. That is, the PSK maximum likelihood judgment is performed on the maximum real part number and the maximum imaginary part number, which is specified as follows: the maximum real part number $â_s$ and the maximum imaginary part number $\hat{b}_s$ are taken as the target coordinate ($\hat{a}_s$, $\hat{b}_s$). The corresponding Euclidean distances are calculated with the maximum real part number, the maximum imaginary part number, and each of the constellation point coordinates in the preset constellation point coordinate set $\{(a_s, b_s)|s=1, 2, \ldots, 2^{N_p}\}$. The constellation point coordinates corresponding to the smallest Euclidean distance are used as the PSK symbol judgment result. The formula for calculating the Euclidean distance is expressed as:

$$d = \sqrt{(\hat{a}_s - a_s)^2 + (\hat{b}_s - b_s)^2}.$$

In the above formula, d is the Euclidean distance; $\hat{a}_s$ is the maximum real part number; $\hat{b}_s$ is the maximum imaginary part number; $a_s$ is the horizontal coordinate of the constellation point; and $b_s$ is the vertical coordinate of the constellation point.

In this embodiment, the real-imaginary part judgment is performed on the complex number sequence, and the LoRa modulation information sequence set and the PSK symbol judgment result are output.

In this embodiment, the present disclosure provides the signal transmission method based on CA-LoRa. The modulated bit sequence and the PSK bit sequence are first obtained. The modulated bit sequence is performed with Gray mapping and spread spectrum modulation, and the LoRa signal set is generated. Then, the PSK bit sequence is performed with PSK constellation mapping using the preset constellation point coordinate set, and the PSK constellation point set is outputted. PSK modulation is performed on the LoRa signal set based on the preset imaginary unit and the PSK constellation point set to generate the transmission signal. The complex number sequence is generated based on the transmission signal and the preset discrete-time raw down chirp signal. Finally, the real-imaginary part judgment is performed on the complex number sequence to output the LoRa modulation information sequence set and the PSK symbol judgment result. Based on the above scheme, the transmission signal is generated by performing quadrature modulation on the LoRa signal set based on preset imaginary unit and the PSK constellation point set. The LoRa modulation information sequence set and the PSK symbol judgment result are output based on the transmission signal and the preset discrete-time raw down chirp signal. Thus, while the LoRa modulation information sequence set is transmitted, the PSK symbol judgment result is also transmitted, thereby greatly enhancing the transmission rate of the signal.

Figure 3:
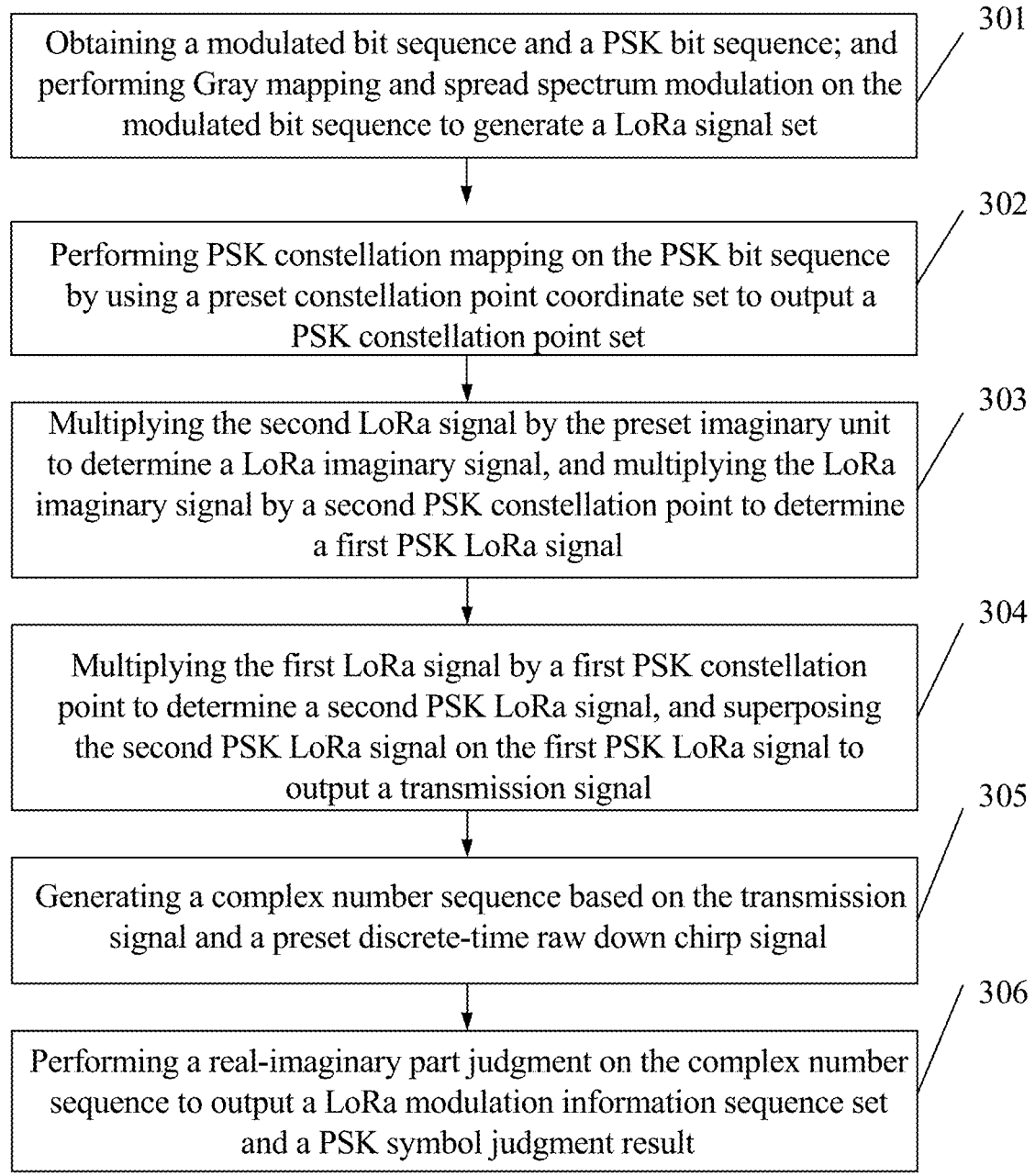
FIG. 3 is a flowchart of a CA-LoRa-based signal transmission method according to another embodiment of the present disclosure.

FIG. 3 shows a flowchart of a signal transmission method based on CA-LoRa according to another embodiment of the present disclosure.

The signal transmission method based on CA-LoRa includes the following steps (301)-(306).

(301) The modulated bit sequence and the PSK bit sequence are obtained, the modulated bit sequence is performed with Gray mapping and spread spectrum modulation, and the LoRa signal set is generated by the LoRa modulator.

The LoRa signal set includes the first LoRa signal and the second LoRa signal.

Specifically, step (301) further include the following steps (S11)-(S14).

(S11) The serial-parallel conversion operation is performed on the modulated bit sequence to generate the parallel modulated bit sequence.

(S12) The parallel modulated bit sequence is divided to determine the first parallel modulated bit subsequence and the second parallel modulated bit subsequence.

(S13) Gray mapping and decimal conversion are performed on the first parallel modulated bit subsequence and the second parallel modulated bit subsequence, respectively, to generate the first decimal information data and the second decimal information data.

(S14) LoRa modulation is performed on the first decimal information data and the second decimal information data, respectively, to generate the first LoRa signal and the second LoRa signal.

Figure 4:
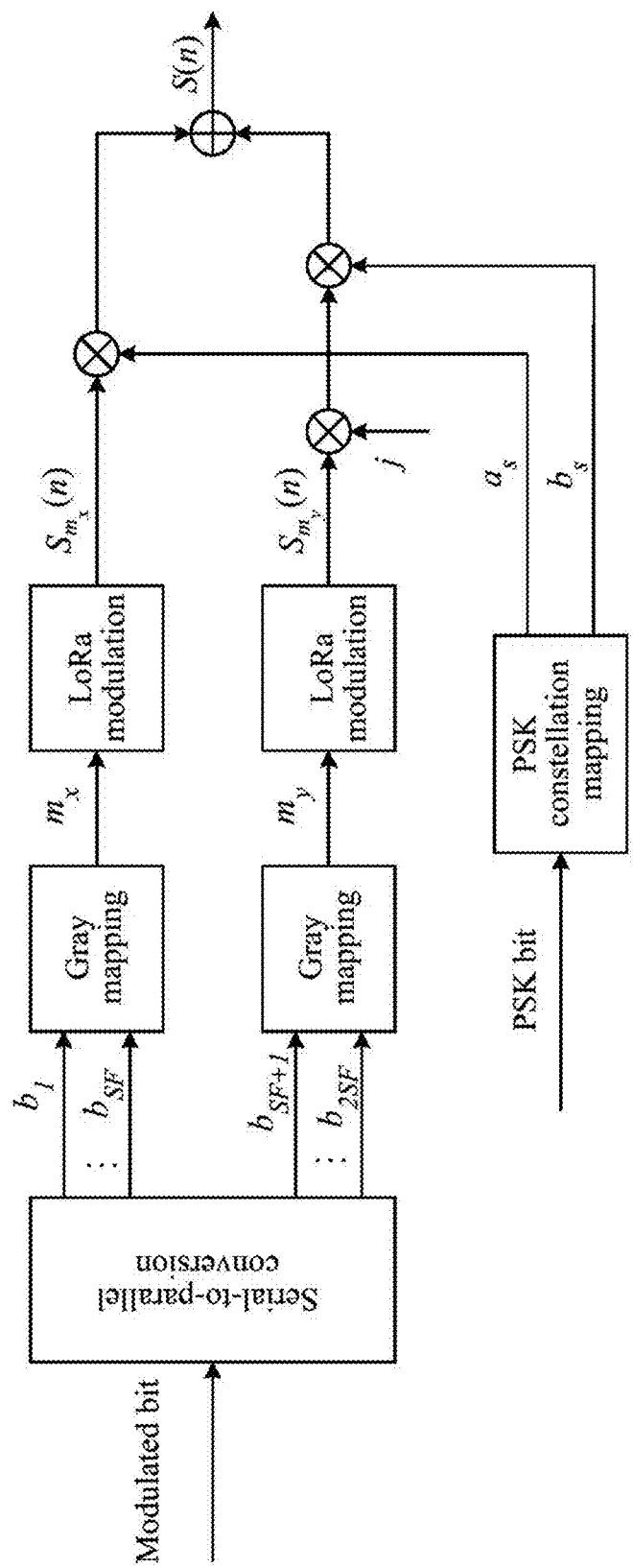
FIG. 4 shows a processing process of modulated bit sequence and PSK bit sequence by a transmitter according to an embodiment of the present disclosure.

It should be noted that, referring to FIG. 4, the total number of information bits transmitted through the transceiver system in one symbol cycle is P. The transceiver system includes the transmitter, the wireless channel, and the receiver. After inputting the modulated bit sequence into the transmitter, the processing of the modulated bit sequence by the transmitter is as follows: the modulated bit sequence of $P_1$ bits is divided into two parts: the first parallel modulated bit subsequence $[b_1, b_2, \ldots b_{2SF}]$ and the second parallel modulated bit subsequence $[b_{SF+1}, b_{SF+2}, \ldots b_{2SF}]$. $b_1$ is the first parallel modulated bit in the first parallel modulated bit subsequence. $b_2$ is the second parallel modulated bit in the first parallel modulated bit subsequence. $b_{SF}$ is the SF-th parallel modulated bit in the first parallel modulated bit subsequence. $b_{SF+1}$ is the (SF+1)-th parallel modulated bit in the second parallel modulated bit subsequence. $b_{SF+2}$ is the (SF+2)-th parallel modulated bit in the second parallel modulated bit subsequence. $b_{2SF}$ is the 2SF-th parallel modulated bit in the second parallel modulated bit subsequence.

Further, the two parts of the first parallel modulated bit subsequence $[b_1, b_2, \ldots b_{SF}]$ and the second parallel modulated bit subsequence $[b_{SF+1}, b_{SF+2}, \ldots b_{2SF}]$ are respectively subjected to Gray mapping and decimal conversion to obtain decimal information, i.e., the first decimal information data $m_x$ and the second decimal information data $m_y$. Then, the first decimal information data $m_x$ and the second decimal information data $m_y$ are performed with LoRa modulation to obtain two LoRa signals, i.e., the first LoRa signal $s_{m_x}(n)$ and the second LoRa signal $s_{m_y}(n)$, respectively.

In this embodiment, the modulated bit sequence and the PSK bit sequence are obtained, the Gray mapping and spread spectrum modulation is performed on the modulated bit sequence, and the LoRa signal set is generated.

(302) PSK constellation mapping is performed on the PSK bit sequence by using the preset constellation point coordinate set to output the PSK constellation point set.

In this embodiment, the PSK constellation mapping is performed on the PSK bit sequence by using the preset constellation point coordinate set to output the PSK constellation point set.

(303) The second LoRa signal is multiplied by the preset imaginary unit to determine the second LoRa imaginary signal. The second LoRa imaginary signal is multiplied by the second PSK constellation point to determine the second PSK LoRa signal.

In this embodiment, the second LoRa signal is multiplied by the preset imaginary unit to determine the second LoRa imaginary signal. The second LoRa imaginary signal is multiplied by the second PSK constellation point to determine the second PSK LoRa signal.

(304) The first LoRa signal is multiplied by the first PSK constellation point to determine the first PSK LoRa signal.

The first PSK LoRa signal and the second PSK LoRa signal are superimposed to output the transmission signal.

In this embodiment, the first LoRa signal is multiplied by the first PSK constellation point to determine the first PSK LoRa signal. The first PSK LoRa signal and the second PSK LoRa signal are superimposed to output the transmission signal.

(305) The complex number sequence is generated based on the transmission signal and the preset discrete-time raw down chirp signal.

Further, step (305) may include the following steps (S51)-(S54).

(S51) The transmission signal is performed with channel interference through the wireless channel to output the received signal.

(S52) The received signal is multiplied by the preset discrete-time raw down chirp signal to determine the received chirp signal.

(S53) The received chirp signal is subjected to the de-chirp operation to output the de-chirped signal.

(S54) The de-chirped signal is subjected to the DFT to generate the complex number sequence.

Figure 5:
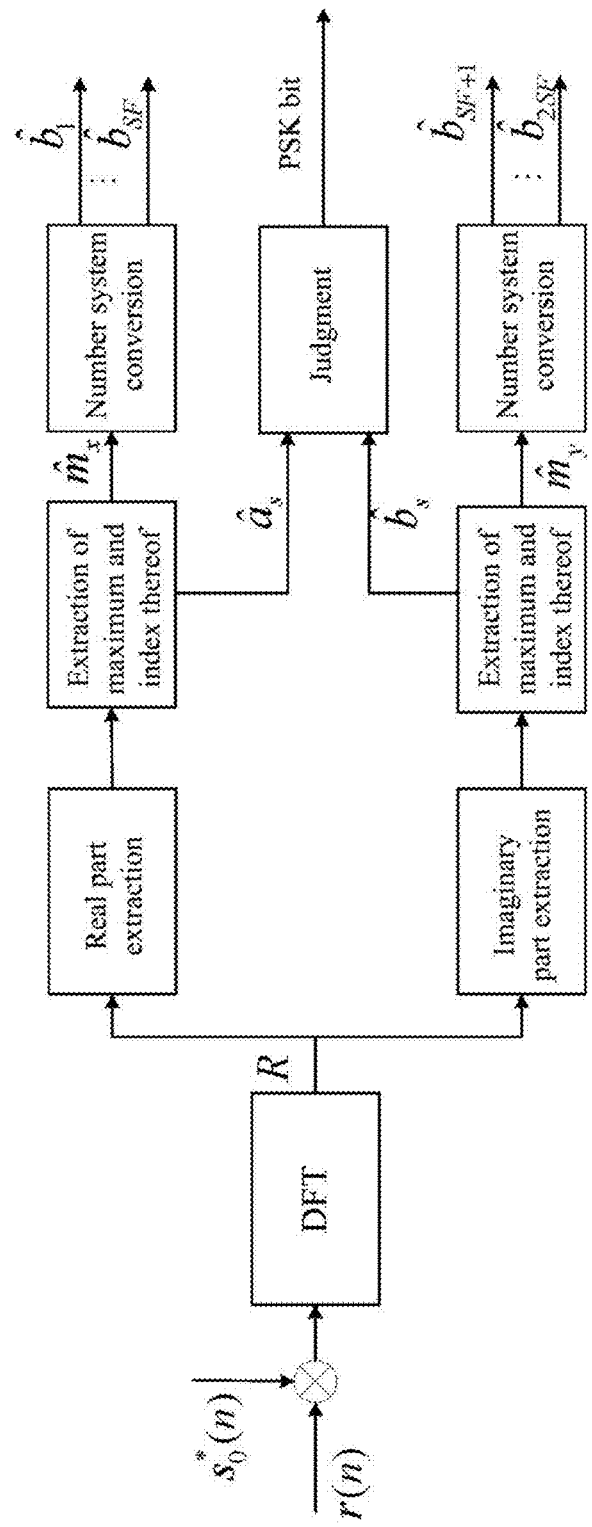
FIG. 5 shows a processing process for a received signal and a preset discrete-time raw down chirp signal by a receiver according to an embodiment of the present disclosure.

It should be noted that, referring to FIG. 5, unlike the traditional LoRa demodulation, the present disclosure adopts coherent demodulation, which needs to know the channel state information (CSI) h (amplitude of the fading channel coefficient). After performing the channel interference processing, the obtained received signal and the preset discrete-time raw down chirp signal are inputted to the receiver together. The processing process for the received signal and the preset discrete-time raw down chirp signal by the receiver is as follows. The received signal is multiplied by the discrete-time raw down chirp signal (preset discrete-time raw down chirp signal) and the complex conjugate h* of h, then performed with the de-chirp operation, and then performed with the DFT operation of M points to obtain the result of the DFT, i.e., the complex number sequence. The real-imaginary part judgment is performed on the complex number sequence to output the LoRa modulation information sequence set and the PSK symbol judgment result.

In this embodiment, the complex number sequence is generated according to the transmission signal and the preset discrete-time raw down chirp signal.

(306) The complex number sequence is performed with the real-imaginary part judgment to output the LoRa modulation information sequence set and the PSK symbol judgment result.

The LoRa modulation information sequence set includes the first LoRa modulation information sequence and the second LoRa modulation information sequence.

Further, step (306) may include the following steps (S61)-(S65).

(S61) The real part extraction and the imaginary part extraction are performed on the complex number sequence, respectively, to determine the real part sequence and the imaginary part sequence.

(S62) The maximum real part number and the maximum imaginary part number are selected from the real part sequence and the imaginary part sequence, respectively.

(S63) The first index value corresponding to the maximum real part number and the second index value corresponding to the maximum imaginary part number are performed with number system conversion to output the first LoRa modulation information sequence and the second LoRa modulation information sequence, respectively.

(S64) A plurality of Euclidean distances are calculated using the maximum real part number, the maximum imaginary part number, and a plurality of constellation point coordinates in the preset constellation point coordinate set.

(S65) The constellation point coordinates corresponding to the smallest Euclidean distance are used as the PSK symbol judgment result.

It should be noted that since the peak value of the DFT results of the first LoRa signal is located in the real part, and the peak value of the DFT result of the second LoRa signal is located in the imaginary part, it is necessary to extract the real part and the imaginary part, respectively, and then the two signals are separately demodulated. Specifically, for example, demodulation of the first LoRa signal requires extracting the real part of R(k) to obtain one real part sequence $R_r(k)=Real[R(k)]$, k=1, 2, . . . , M.

In the formula, k is the total number of real numbers; and Real[.] represents the real part extraction. Then, the maximum value is found in the real part sequence $R_r(k)$. Then, the maximum value of the real number and the index value corresponding to the maximum value of the real number are obtained, respectively. The maximum value is the estimated value $\hat{a}_s$ of $a_s$. The index value corresponding to the maximum value of real number is the estimated value $\hat{m}_x$ of $m_x$. Then $\hat{m}_x$ is performed with number system conversion, so that the information transmitted by the first LoRa signal can be recovered to obtain the first LoRa modulation information sequence $[\hat{b}_1, \hat{b}_2, \ldots \hat{b}_{SF}]$. Then, the imaginary part of R(k) is extracted, and the operation described above for the real part sequence can be performed to recover the information transmitted by the second LoRa signal, so as to obtain the second LoRa modulation information sequence $[\hat{b}_{SF+1}, \hat{b}_{SF+2}, \ldots \hat{b}_{2SF}]$ and obtain the estimated value $\hat{b}_s$ of $b_s$. Finally, the PSK maximum likelihood judgment can be performed again by $\hat{a}_s$ and $\hat{b}_s$. The corresponding PSK bits can be judged, i.e., the constellation point with the smallest Euclidean distance from the target coordinate $[\hat{a}_s, \hat{b}_s]$ can be found out, and this constellation point is the judgment result of the PSK symbol (the judgment result of the PSK symbol).

Figure 6:
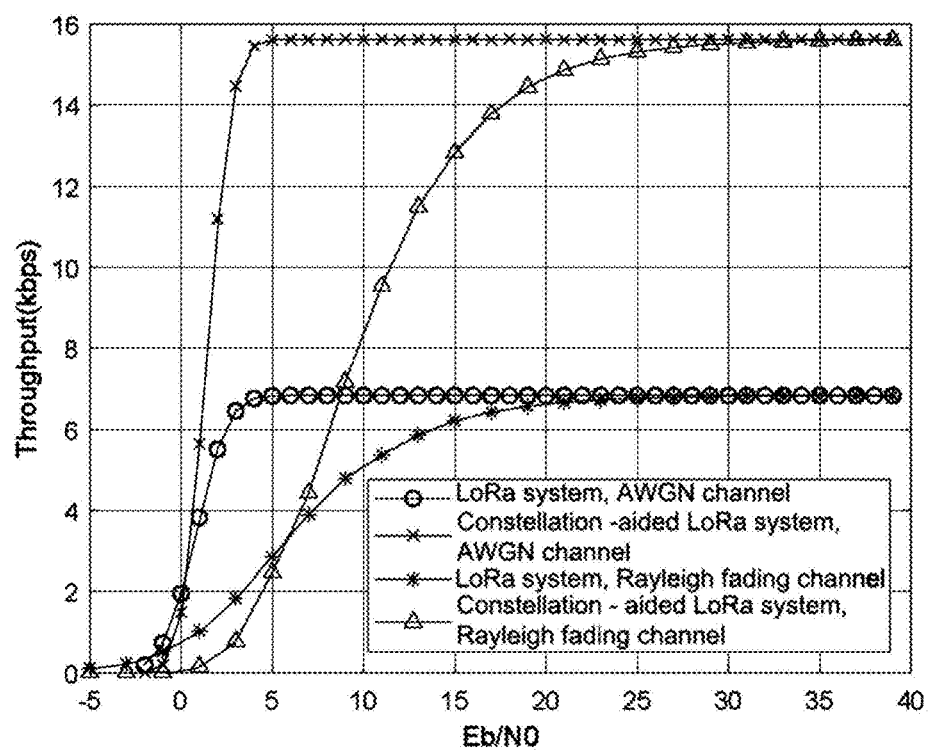
FIG. 6 is a comparison graph of throughputs between the CA-LoRa system of the present disclosure and a conventional LoRa system with a spreading factor SF=7 and assisted by constellation diagrams under additive white Gaussian noise (AWGN) channel and Rayleigh fading channel according to an embodiment of the present disclosure.

Further, referring to FIG. 6, at the spreading factor SF=7, the number of bits carried by PSK symbol in the constellation diagram-assisted LoRa system is represented as $P_2$, and $P_2=2$. The constellation diagram-assisted LoRa system is the LoRa transceiver system in the present disclosure. The number of symbols per frame of information is represented as $N_{pa}$, and $N_{pa}=8$. The throughput is an important indicator of the transmission rate of the system. The calculation formula for the throughput is expressed as:

$$T_R = \frac{N_{pa} N_b (1 - P_{pa})}{T_s}.$$

Where $T_R$ represents the throughput; $N_{pa}$ represents the number of symbols contained in one frame of information; $N_b$ represents the number of bits carried by the system during one symbol; $P_{pa}$ represents the frame error rate, and $P_{pa}=1-(1-P_s)^{N_{pa}}$; $P_s$ represents the symbol error rate of the system; and $T_s$ represents the transmission time of one frame of information.

As shown in FIG. 6, compared to the conventional LoRa system, at the spreading factor SF=7 and $P_2=2$, the throughput of the constellation diagram-assisted LoRa system is improved by 128.6%.

Figure 7:
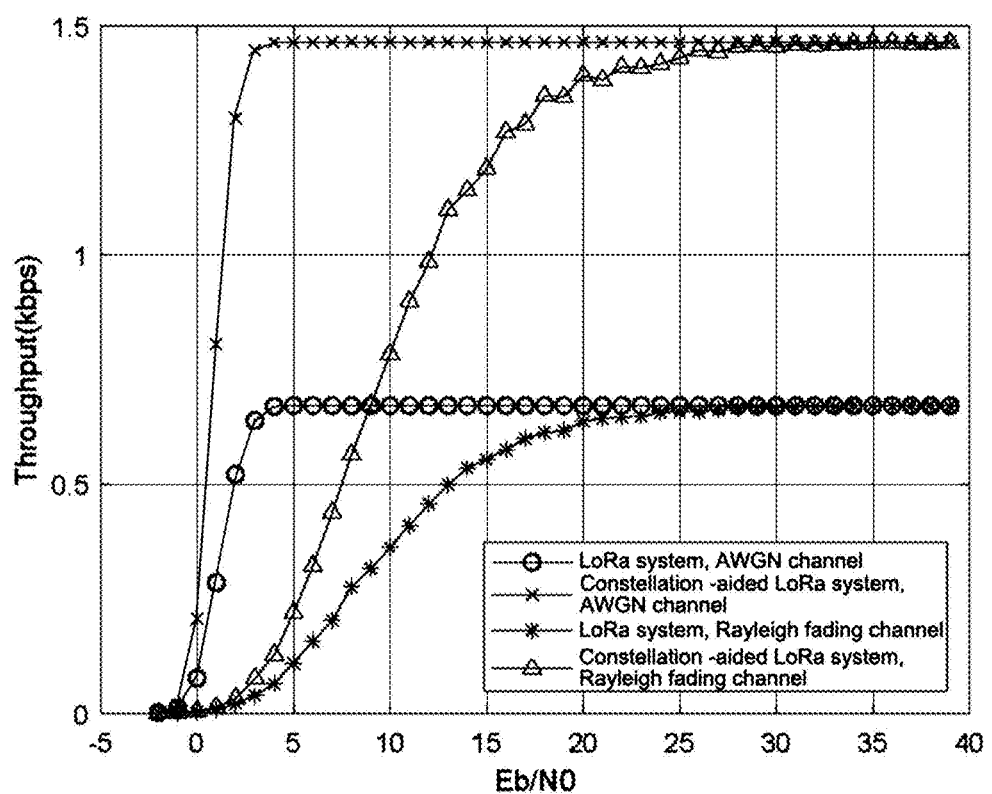
FIG. 7 is a comparison graph of throughputs between the CA-LoRa system of the present disclosure and the conventional LoRa system with the spreading factor SF=11 and assisted by the constellation diagrams under AWGN channel and Rayleigh fading channel.

Further, referring to FIG. 7, at the spreading factor SF=11, the number of bits $P_2$, which are carried by PSK symbols in the LoRa transceiver system proposed in the present disclosure, is 2, namely $P_2=2$. The number of symbols $N_{pa}$ per frame of information is $N_{pa}$, and $N_{pa}$=8. The throughput of the constellation diagram-assisted LoRa system is improved by 118.2% compared to the conventional LoRa system.

In this embodiment, the real-imaginary part judgment is performed on the complex number sequence, and the LoRa modulation information sequence set and the PSK symbol judgment result are output.

Regarding technical effects, the prior art can be used as the reference. The existing LoRa modulation is an enhanced version of CSS modulation. In LoRa modulation, each symbol can carry SF bits, and each symbol consists of $2^{SF}$ chips, and SF∈{7, ..., 12} denotes the spreading factor. The bandwidth and the symbol period of the LoRa signal set are defined as B and $$T_{chip} = \frac{1}{B}.$$

Figure 8:
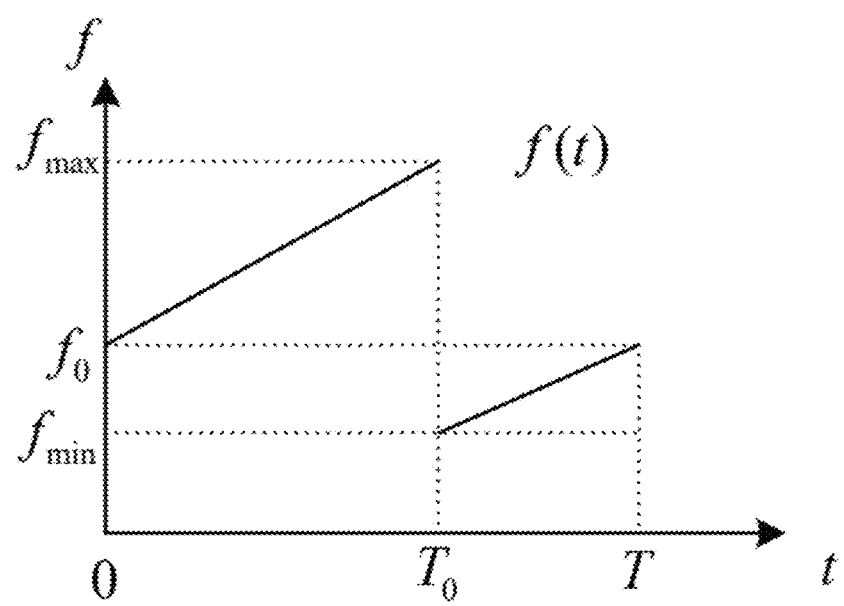
FIG. 8 shows a schematic diagram of a LoRa signal frequency over time according to an embodiment of the present disclosure.

As shown in FIG. 8, in one symbol period, the frequency of the LoRa signal set first varies linearly from the initial frequency $f_0$ to the maximum frequency $f_{max}$, and then rises from the minimum frequency $f_{min}$ to the initial frequency $f_0$. Thus, the signal covers the entire bandwidth. Thus, for clearer description, the discrete-time baseband signal of the LoRa modulation scheme can be represented as:

$$s_m(n) = \sqrt{\frac{E_s}{M}} \exp\left(j\frac{2\pi}{M}mn\right)c(n).$$

Where $s_m(n)$ is the discrete-time baseband signal; $E_s$ represents the energy carried by the transmitted symbol; M is the number of chips of the LoRa symbol, $M=2^{SF}$; j is the imaginary unit; m is the decimal information carried by the LoRa signal set; n is the time-domain index, n=0, 1, 2, ..., M−1; C(n) represents the discrete-time raw up-chirp signal, and $$C(n) = \exp\left(\frac{j\pi n^2}{M}\right).$$

Further, the transmission signal arrives at the target receiving end after transmission over the wireless channel to obtain the received signal. In order to recover the information bits, first, the received signal needs to be multiplied by the discrete-time raw down chirp signal (this step is called de-chirping). $s^*_0(n)$ represents the complex conjugate form of the discrete-time raw down chirp signal and is expressed as:

$$s_0^*(n) = \exp\left(-\frac{j\pi n^2}{M}\right).$$

Where $s^*_0(n)$ represents the complex conjugate of the discrete-time raw down chirp signal; j is the imaginary unit; n is the time domain index, n=0, 1, 2, ..., M−1; and M is the number of chips of the LoRa symbol.

Further, the de-chirped signal is subjected to DFT at M points to obtain the complex number sequence expressed as:

$$R(k) = \sum_{n=0}^{M-1} r(n)h^* s_0^*(n)\exp\left\{-\frac{j\pi n^2}{M}\right\} = \begin{cases} \sqrt{\frac{E_s}{M}} + W(k), k = m \\ W(k), k \neq m \end{cases}.$$

Where R(k) represents the complex number sequence after the DFT; M is the number of chips of the LoRa symbol; r(n) is the received signal; $s^*_0(n)$ represents the complex conjugate of the discrete-time raw down chirp signal; $E_s$ represents the symbol energy; W(k) represents a complex Gaussian noise; k is the frequency index, k=0, 1, 2, ..., M−1; and n is the time domain index, n=0, 1, 2, ..., M−1.

Further, the transmitted information can be recovered by performing the modulo operation on the result of the DFT and selecting the largest term thereof, and k̂=arg max(|R(k)|. Finally, the information bits can be recovered by converting decimal k̂ to binary.

Further, for the exemplary LoRa scheme mentioned above, the transmission efficiency and the transmission distance can be adjusted by the spreading factor. The larger the spreading factor is, the farther the transmission distance will be, but at the cost of a much lower transmission rate. Therefore, the transmission efficiency of this scheme needs to be further improved.

To solve the above problem, the present disclosure provides the signal transmission method based on CA-LoRa.

The conventional LoRa signal and the signal obtained by rotating the phase of the conventional LoRa signal by 90° are used as a set of orthogonal bases to transmit additional PSK symbol. In addition to transmitting the 2SF bits carried by the LoRa signal, it can also carry the $P_2$ bits carried by the PSK symbols. To address the problem of low transmission rate in the conventional LoRa system, the present disclosure uses the up-chirp signal and the signal obtained by rotating the up-chirp signal by 90° in phase as a set of orthogonal bases, which allows for simultaneous transmission of two LoRa signals while transmitting the additional PSK symbols, thereby improving greatly the transmission rate of the system. In view of the above problem that the bit error rate (BER) performance of the traditional LoRa system is relatively low, the present disclosure can effectively improve the BER performance of the system to a certain extent and can realize the effect of a high data rate, thereby providing a broader application prospect.

In this embodiment, the present disclosure provides the signal transmission method based on CA-LoRa. The modulated bit sequence and the PSK bit sequence are first obtained, the modulated bit sequence is performed with Gray mapping and spread spectrum modulation, and the LoRa signal set is generated. Then, the PSK bit sequence is performed with PSK constellation mapping by using the preset constellation point coordinate set to output the PSK constellation point set. PSK modulation is performed on the LoRa signal set based on the preset imaginary unit and the PSK constellation point set to generate the transmission signal. The complex number sequence is generated based on the transmission signal and the preset discrete-time raw down chirp signal. Finally, the real-imaginary part judgment is performed on the complex number sequence to output the LoRa modulation information sequence set and the PSK symbol judgment result. Based on the above scheme, the transmission signal is generated by performing quadrature modulation on the LoRa signal set based on the preset imaginary unit and the PSK constellation point set. The LoRa modulation information sequence set and the PSK symbol judgment result are output based on the transmission signal and the preset discrete-time raw down chirp signal. Thus, while the LoRa modulation information sequence set is transmitted, the PSK symbol judgment result is also transmitted, thereby greatly enhancing the transmission rate of the signal.

Figure 9:
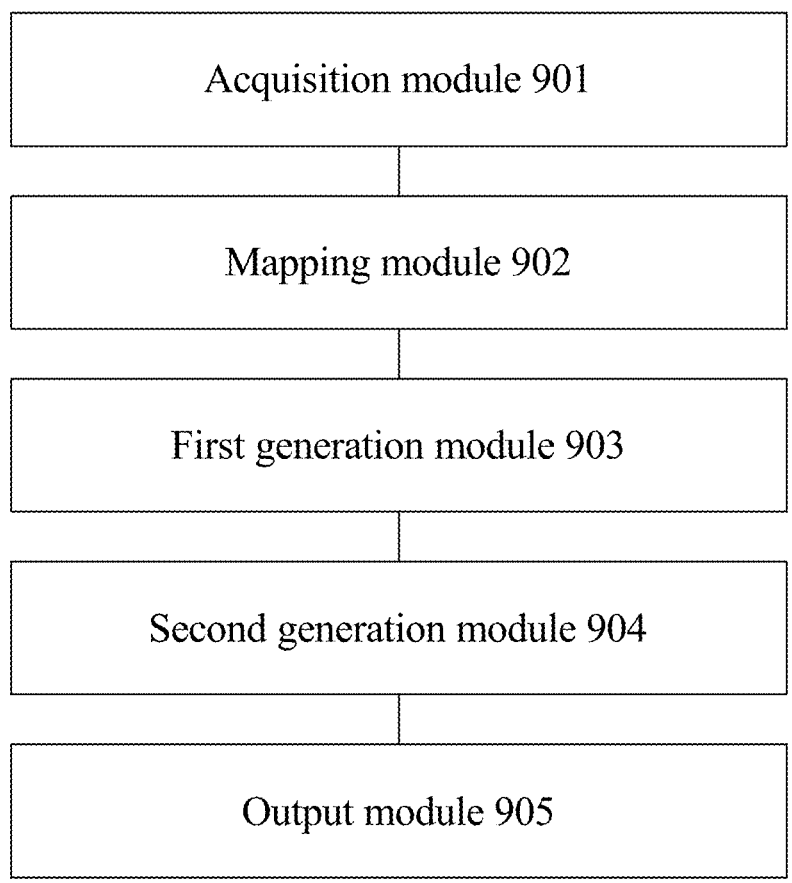
FIG. 9 shows a block diagram showing a structure of a CA-LoRa system according to an embodiment of the present disclosure.

FIG. 9 shows a block diagram of a CA-LoRa-based signal transmission system according to an embodiment of the present disclosure.

The CA-LoRa-based signal transmission system includes an acquisition module 901, a mapping module 902, a first generation module 903, a second generation module 904, and an output module 905.

The acquisition module 901 is configured for obtaining the modulated bit sequence and the PSK bit sequence, and performing the Gray mapping and spread spectrum modulation on the modulated bit sequence to generate the LoRa signal set.

The mapping module 902 is configured for performing PSK constellation mapping on the PSK bit sequence by using the preset constellation point coordinate set to output the PSK constellation point set.

The first generation module 903 is configured for performing PSK modulation on the LoRa signal set based on the preset imaginary unit and the PSK constellation point set to generate the transmission signal.

The second generation module 904 is configured for generating the complex number sequence based on the transmission signal and the preset discrete-time raw down chirp signal.

The output module 905 is configured for performing the real-imaginary portion judgment on the complex number sequence to output the LoRa modulation information sequence set and the PSK symbol judgment result.

Further, the LoRa signal set includes the first LoRa signal and the second LoRa signal.

In an embodiment, specifically, the acquisition module 901 is configured for performing the serial-parallel conversion operation on the modulated bit sequence to generate the parallel modulated bit sequence; dividing the parallel modulated bit sequence to obtain the first parallel modulated bit subsequence and the second parallel modulated bit subsequence; subjecting the first parallel modulated bit subsequence to Gray mapping and decimal conversion to generate a first decimal information data, and subjecting the second parallel modulated bit subsequence to Gray mapping and decimal conversion to generate a second decimal information data; and performing LoRa modulation on the first decimal information data and the second decimal information data to generate the first LoRa signal and the second LoRa signal, respectively.

Further, the PSK constellation point set includes the first PSK constellation point, namely coordinate of the real axis and the second PSK constellation point, namely coordinate of the imaginary axis.

In an embodiment, specifically, the first generation module 903 is configured for multiplying the second LoRa signal by the preset imaginary unit to determine the second LoRa imaginary signal, and multiplying the second LoRa imaginary signal by the second PSK constellation point to determine the second PSK LoRa signal; and multiplying the first LoRa signal by the first PSK constellation point to determine the first PSK LoRa signal, and superimposing the first PSK LoRa signal with the second PSK LoRa signal to output the transmission signal.

In an embodiment, specifically, the second generation module 904 is configured for performing channel interference on the transmission signal to generate the received signal; multiplying the received signal by the preset discrete-time raw down chirp signal to obtain the received chirp signal; de-chirping the received chirp signal to output the de-chirped signal; and performing the discrete Fourier transform on the de-chirped signal to generate the complex number sequence.

Further, the LoRa modulation information sequence set includes the first LoRa modulation information sequence and the second LoRa modulation information sequence.

In an embodiment, specifically, the output module 905 is configured for subjecting the complex number sequence to real part extraction and imaginary part extraction to obtain a real part sequence and an imaginary part sequence, respectively; selecting a maximum real part number from the real part sequence and a maximum imaginary part number from the imaginary part sequence; subjecting an index value corresponding to the maximum real part number and an index value corresponding to the maximum imaginary part number to number system conversion to output the first LoRa modulation information sequence and the second LoRa modulation information sequence, respectively; calculating a plurality of Euclidean distances by using the maximum real part number, the maximum imaginary part number, and a plurality of constellation point coordinates in the preset constellation point coordinate set; and taking a constellation point coordinate corresponding to a smallest Euclidean distance among the plurality of Euclidean distances as the PSK symbol judgment result.

Further, the LoRa signal set is expressed as:

$$\begin{cases} s_{m_x}(n) = \sqrt{\frac{E_s}{M}} \exp\left(j\frac{2\pi}{M}m_x n\right)c(n) \\ s_{m_y}(n) = \sqrt{\frac{E_s}{M}} \exp\left(j\frac{2\pi}{M}m_y n\right)c(n) \end{cases}.$$

In above formulas, $s_{m_x}(n)$ represents the first LoRa signal; $E_s$ represents the energy carried by a transmitted symbol; M is the number of chips of the LoRa symbol, and $M=2^{SF}$; SF is the spreading factor; j is the imaginary unit; $m_x = \Sigma_{i=1}^{SF} b_i 2^i$ is the first decimal information data; n is the time domain index, and n=0, 1, 2, . . . , M−1; C(n) represents the discrete-time raw up-chirp signal, and $$C(n) = \exp\left(\frac{j\pi n^2}{M}\right);$$

$m_y = \Sigma_{i=1}^{SF} b_{SF+i} 2^i$ is the second decimal information data; and $s_{m_y}(n)$ represents the second LoRa signal.

It can be understood that, for the convenience and brevity of description, the specific working processes of the above-described devices and modules can be referred to the corresponding processes in the foregoing embodiments of the method, and will not be repeated herein.

It should be understood that the devices and methods disclosed in the embodiments provided in the present disclosure can be realized in other ways. For example, the above-described embodiments of the device are merely schematic. The division of the described units is merely a logical functional division. The described units may be divided in other ways when actually implemented, e.g., multiple units or components may be combined or may be integrated into another system, or some features may be ignored, or not implemented. The coupling or communication connection shown or discussed may be direct coupling, indirect coupling or communication connection through some interfaces, and indirect coupling or communication connection between devices or units may be electrical, mechanical or other connection ways.

The units illustrated as separated components may or may not be physically separated, and components shown as units may or may not be physical units, i.e., they may be located in a single place or may also be distributed over a plurality of network units. Some or all of these units may be selected to fulfill the purpose of the technical solutions in the embodiments according to actual needs.

Described above are merely preferred embodiments of the disclosure, which are not intended to limit the disclosure. It should be understood that any modifications and replacements made by those skilled in the art without departing from the spirit of the disclosure should fall within the scope of the disclosure defined by the appended claims.

What is claimed is:

1. A signal transmission method based on constellation-aided Long Range (CA-LoRa), comprising:
   (a) obtaining a modulated bit sequence and a phase shift keying (PSK) bit sequence; performing Gray mapping and spread spectrum modulation on the modulated bit sequence; and generating, by a LoRa modulator, a LoRa signal set comprising a first LoRa signal and a second LoRa signal in response to the performing step;
   (b) performing PSK constellation mapping on the PSK bit sequence by using a preset constellation point coordinate set to output a phase shift keying (PSK) constellation point set comprising a first PSK constellation point and a second PSK constellation point;
   (c) performing PSK modulation on the LoRa signal set based on a preset imaginary unit and the PSK constellation point set to generate a transmission signal;
   (d) generating a complex number sequence based on the transmission signal and a preset discrete-time raw down chirp signal; and
   (e) performing a real-imaginary part judgment on the complex number sequence to output a LoRa modulation information sequence set and a PSK symbol judgment result;
   wherein step (c) comprises:
   (c1) rotating, by a phase shifter, a phase of the second LoRa signal by $\pi/2$; multiplying the second LoRa signal by the preset imaginary unit to obtain a LoRa imaginary signal; and multiplying the LoRa imaginary signal by the second PSK constellation point to obtain a first PSK LoRa signal; and
   (c2) multiplying the first LoRa signal by the first PSK constellation point to obtain a second PSK LoRa signal; subjecting the second PSK LoRa signal and the first PSK LoRa signal to superposition to generate the transmission signal; outputting, by a LoRa terminal, the transmission signal.

2. The signal transmission method of claim 1, wherein the LoRa signal set is generated through steps of:
   (a1) performing a serial-parallel conversion operation on the modulated bit sequence to generate a parallel modulated bit sequence;
   (a2) dividing the parallel modulated bit sequence into a first parallel modulated bit subsequence and a second parallel modulated bit subsequence;
   (a3) subjecting the first parallel modulated bit subsequence to Gray mapping and decimal conversion to generate a first decimal information data, and subjecting the second parallel modulated bit subsequence to Gray mapping and decimal conversion to generate a second decimal information data; and
   (a4) performing LoRa modulation on the first decimal information data and the second decimal information data to generate the first LoRa signal and the second LoRa signal, respectively.

3. The signal transmission method of claim 2, wherein step (d) comprises:
   performing channel interference on the transmission signal to generate a signal, and deploying a LoRa gateway to receive the signal as a received signal;
   multiplying the received signal by the preset discrete-time raw down chirp signal to obtain a received chirp signal;
   de-chirping the received chirp signal to output a de-chirped signal; and
   performing discrete Fourier transform on the de-chirped signal to generate the complex number sequence.

4. The signal transmission method of claim 2, wherein the LoRa modulation information sequence set comprises a first LoRa modulation information sequence and a second LoRa modulation information sequence; and
   step (e) comprises:
   subjecting the complex number sequence to real part extraction and imaginary part extraction to obtain a real part sequence and an imaginary part sequence, respectively;
   selecting a maximum real part number from the real part sequence and a maximum imaginary part number from the imaginary part sequence;
   subjecting an index value corresponding to the maximum real part number and an index value corresponding to the maximum imaginary part number to number system conversion to output the first LoRa modulation information sequence and the second LoRa modulation information sequence, respectively;
   calculating a plurality of Euclidean distances by using the maximum real part number, the maximum imaginary part number, and a plurality of constellation point coordinates in the preset constellation point coordinate set; and
   taking a constellation point coordinate corresponding to a smallest Euclidean distance among the plurality of Euclidean distances as the PSK symbol judgment result; and sending, by a LoRa gateway, the first LoRa modulation information sequence, the second LoRa modulation information sequence, and the PSK symbol judgment result to a server for data processing.

5. The signal transmission method of claim 2, wherein the LoRa signal set is expressed as:

$$\begin{cases} s_{m_x}(n) = \sqrt{\frac{E_s}{M}} \exp\left(j\frac{2\pi}{M}m_x n\right) c(n) \\ s_{m_y}(n) = \sqrt{\frac{E_s}{M}} \exp\left(j\frac{2\pi}{M}m_y n\right) c(n) \end{cases};$$

wherein $s_{m_x}(n)$ represents the first LoRa signal; $E_s$ represents an energy carried by a transmitted symbol; M is the number of chips of a LoRa symbol, and $M=2^{SF}$; SF is a spreading factor; j is the preset imaginary unit, and $j^2=-1$; $m_x$ is the first decimal information data; n is a time domain index, and $n=0, 1, 2, \ldots, M-1$; $C(n)$ represents a discrete-time raw up-chirp signal, and $$C(n) = \exp\left(\frac{j\pi n^2}{M}\right);$$

$m_y$ is the second decimal information data; and $s_{m_y}(n)$ represents the second LoRa signal.

6. A computer device, comprising:
a processor;
a memory; and
a computer program;
wherein the computer program is stored in the memory; and the computer program is configured to be executed by the processor to perform the signal transmission method of claim 1.

* * * * *